(12) United States Patent
Matsui et al.

(10) Patent No.: US 8,804,075 B2
(45) Date of Patent: Aug. 12, 2014

(54) COLOR FILTER AND COLOR FILTER MANUFACTURING METHOD

(75) Inventors: Kohei Matsui, Tokyo (JP); Kaoru Hatta, Tokyo (JP); Ryosuke Yasui, Tokyo (JP)

(73) Assignee: Toppan Printing Co., Ltd., Tokyo (JP)

( * ) Notice: Subject to any disclaimer, the term of this patent is extended or adjusted under 35 U.S.C. 154(b) by 159 days.

(21) Appl. No.: 13/138,479

(22) PCT Filed: Feb. 24, 2010

(86) PCT No.: PCT/JP2010/001253
§ 371 (c)(1), (2), (4) Date: Sep. 22, 2011

(87) PCT Pub. No.: WO2010/098093
PCT Pub. Date: Sep. 2, 2010

(65) Prior Publication Data
US 2012/0026435 A1   Feb. 2, 2012

(30) Foreign Application Priority Data
Feb. 26, 2009   (JP) .................................. 2009-043714

(51) Int. Cl.
G02F 1/1335   (2006.01)
G02B 5/20   (2006.01)
G02F 1/1339   (2006.01)

(52) U.S. Cl.
CPC .......... *G02B 5/201* (2013.01); *G02F 1/133516* (2013.01); *G02F 1/13394* (2013.01)
USPC ....................................................... 349/106

(58) Field of Classification Search
USPC ....................................................... 349/106
See application file for complete search history.

(56) References Cited

U.S. PATENT DOCUMENTS

| | | | |
|---|---|---|---|
| 7,327,419 B2 * | 2/2008 | Kocha et al. | 349/106 |
| 7,724,345 B2 * | 5/2010 | Tsuji et al. | 349/157 |

(Continued)

FOREIGN PATENT DOCUMENTS

| | | |
|---|---|---|
| JP | 2000-29042 | 1/2000 |
| JP | 2002-333628 | 11/2002 |

(Continued)

OTHER PUBLICATIONS

Korean Office Action issued Aug. 31, 2012 in corresponding Korean Patent Application No. 10-2011-7020256.

(Continued)

*Primary Examiner* — James Dudek

(57) ABSTRACT

A color filter having excellent display quality is provided by a continuous exposure method using a compact photomask. The color filter includes: a substrate; a black matrix formed on the substrate, for dividing the substrate into rectangular display regions in which the plurality of pixels are arrayed, and non-display regions surrounding the display regions; a stripe pattern; a plurality of columnar spacers disposed in the display regions; and a plurality of dummy columnar spacers. The stripe pattern includes a plurality of colored layers extending in one direction. Each colored layer intersects with a pair of sides of the display region in a direction perpendicular to the direction in which the colored layers extend. The thickness of both end portions of each colored layer disposed on the non-display region is not uniform. The dummy columnar spacers are disposed in portions of the non-display regions, where the colored layers are absent.

2 Claims, 22 Drawing Sheets

(56) References Cited

U.S. PATENT DOCUMENTS

| | | |
|---|---|---|
| 2006/0147682 A1 | 7/2006 | Takahashi |
| 2009/0009697 A1 | 1/2009 | Tsuji et al. |

FOREIGN PATENT DOCUMENTS

| | | |
|---|---|---|
| JP | 2005-202084 | 7/2005 |
| JP | 2006-17895 | 1/2006 |
| JP | 2006-162875 | 6/2006 |
| JP | 2006-292955 | 10/2006 |
| JP | 2007-121344 | 5/2007 |
| JP | 2008-185730 | 8/2008 |
| JP | 2008-225082 | 9/2008 |
| WO | 2006/013933 A1 | 2/2006 |
| WO | 2007/049436 A1 | 5/2007 |

OTHER PUBLICATIONS

English Translation of Japanese Reference No. 2007-121344, published May 17, 2007.
International Search Report for PCT/JP2010/001253, mailed Jun. 1, 2010.

* cited by examiner

COLOR FILTER AND COLOR FILTER MANUFACTURING METHOD

CROSS REFERENCE TO RELATED APPLICATIONS

This application is a national phase application, under 35 U.S.C. 371, of international application No. PCT/JP2010/001253, filed on Feb. 24, 2010, which claimed priority to Japanese Patent Application No. 2009-043714, filed on Feb. 26, 2009, the disclosures of which are incorporated herein by reference.

TECHNICAL FIELD

The present invention relates to color filters which are used in liquid crystal display devices and organic EL displays, and methods for manufacturing the color filters.

BACKGROUND ART

In display devices such as liquid crystal display devices, color filters are widely used for the purposes of color image display, reflectance reduction, contrast adjustment, spectral characteristic control, and the like. A color filter is formed by arranging colored pixels in a matrix on a substrate. Methods for forming such colored pixels on a substrate include, for example, printing and photolithography.

FIG. 6 is an enlarged view of pixels of a color filter, and FIG. 7 is a cross-sectional view of the pixels, taken along a line X-X in FIG. 6.

The color filter shown in FIGS. 6 and 7 includes a substrate 50, a lattice-shaped black matrix 21 formed on the substrate 50, colored pixels 22, and a transparent conductive film 23. The black matrix 21 has a light-shielding property, defines the positions of the colored pixels 22 on the substrate 50, and makes the size of the colored pixels 22 uniform. In addition, when the color filter is used in a display device, the black matrix 21 blocks unnecessary light to achieve a high-contrast, even, and uniform image quality. The colored pixels 22 function as a filter for reproducing various colors.

A color filter is formed as follows. Firstly, a black photoresist is applied to the substrate 50, and exposed to light through a photomask and then developed, thereby forming a black matrix 21. Next, a color resist is applied to the substrate 50, and exposed to light through a photomask and then developed, thereby forming colored pixels 22. The process of forming colored pixels 22 is repeated until colored pixels 22 of all colors are formed on the substrate. Further, ITO (Indium Tin Oxide) is deposited by sputtering over the entire surface of the substrate 50 so as to cover the black matrix 21 and the colored pixels 22, thereby forming a transparent conductive film 23.

In mass production of the above-described color filter, it is general to form an array of a plurality of color filters on a single large substrate. For example, four color filters each having a diagonal of 17 inches can be formed on a glass substrate having a size of about 650 mm×850 mm.

As described above, in order to form a plurality of color filters on a single substrate, exposure has been popularly performed by using a photomask of approximately the same size as the substrate, on which a plurality of mask patterns corresponding to all the color filters are formed (for example, in the above-described example, a photomask on which four mask patterns corresponding to color filters each having a diagonal of 17 inches are formed). According to this method, patterns corresponding to all the mask patterns on the photomask are simultaneously formed on the substrate by a single exposure (so-called one-shot exposure).

However, the size of the photomask is increased with an increase in the size of the color filter. Thereby, the manufacturing cost of the photomask increases, and moreover, a problem of deflection of the photomask may occur due to its own weight at the time of exposure.

So, in order to resolve the problems of high cost and deflection due to an increase in the size of the photomask, an exposure method has been adopted, in which a plurality of exposures are performed by using a single photomask capable of simultaneously exposing a plurality of color filters, while changing the position of the photomask opposed to a substrate. For example, when the size of the substrate became about 730 mm×920 mm (the fourth generation), a single-axis step exposure method was adopted, in which exposure is repeated with the substrate being moved in steps along one direction with respect to a photomask. When the size of the glass substrate became about 1000 mm×1200 mm (the fifth generation), an XY (two-axis) step exposure method (step and repeat method) was adopted, in which exposure is repeated with the substrate being moved in steps along two directions with respect to a photomask.

FIG. 8 is a plan view illustrating an example of manufacturing of color filters by the XY step exposure method.

On a substrate 50, first to sixth exposure regions 1Ex to 6Ex are provided, in which six (two rows×three columns) color filters are to be exposed. The substrate 50 is placed on an exposure stage 60, and is freely movable in the X and Y directions.

Firstly, exposure is performed with a photomask PM being overlapped with the first exposure region 1Ex to form a mask pattern of the photomask PM in the first exposure region 1Ex. Thereafter, the substrate 50 is moved by a distance Py in the positive direction of the Y axis to overlap the photomask PM with the second exposure region 2Ex, and a pattern of the photomask PM is formed in the second exposure region 2Ex. Next, the substrate 50 is moved by a distance Px in the positive direction of the X axis to overlap the photomask PM with the third exposure region 3Ex, and a pattern of the photomask PM is formed in the third exposure region 3Ex. Thereafter, in a similar manner to above, exposure is repeated with the substrate 50 being moved in the X direction or the Y direction, thereby forming patterns in the fourth to sixth exposure regions 4Ex to 6Ex.

The use of the XY 2-axis step exposure method resolves the problem of an increase in manufacturing cost due to an increase in the size of the photomask, and the problem of deflection of the photomask due to its own weight. However, if the size of the substrate is further increased (for example, about 1500 mm×1800 mm (the sixth generation) or about 2100 mm×2400 mm (the eighth generation)), the color filters themselves formed on the substrate are also increased in size, which eventually causes an increase in the size of the photomask. As a result, the problems of high cost and deflection of the photomask occur again.

So, an exposure method is attempted, in which exposure is continuously performed by using a photomask smaller than a single color filter, while transferring a substrate.

FIG. 9 is a plan view illustrating a slit exposure method. FIG. 10 is a cross-sectional view taken along a line X-X in FIG. 9. FIG. 11 is a partially enlarged view of a mask pattern of a photomask shown in FIG. 9. FIG. 12 is a partially enlarged view of stripe patterns exposed by the slit exposure method. In FIG. 10, part (a) shows a state where exposure of a first exposure region is started, and part (b) shows a state where exposure of the first exposure region is completed.

As shown in FIGS. 9 and 10, in the slit exposure method, a photomask PM2, which is smaller in size than a first exposure region 1Ex of a substrate 50 placed on an exposure stage 60, is disposed between the substrate 50 and a light source (not shown). The exposure stage 60 is movable at a constant speed in the horizontal direction of the figure, and further, is movable in steps in the vertical direction of the figure along the Y axis. As shown in FIG. 11, the photomask PM2 has a slit S for exposing a portion of a pattern formed in the first exposure region 1Ex. In the longitudinal direction Ls of the slit S, a plurality of openings 51 are aligned at predetermined intervals Pi. The width and length of each opening 51 are Wi and Li, respectively.

When exposing the first exposure region 1Ex, as shown in FIGS. 9 and 10(a), the photomask PM2 is placed on the left end of the first exposure region 1Ex. Then, while irradiating the photomask PM2 with a light beam from the light source, the substrate 50 is continuously transferred leftward in FIG. 6 along the X axis, until reaching the state shown in FIG. 10(b). As a result, as shown in FIG. 12, stripe patterns each having a width Wi and an interval Pi are formed, on the substrate 50, extending in the substrate transfer direction (the horizontal direction of FIG. 9).

After the exposure of the first exposure region, the exposure stage 60 is moved by a distance Py in the positive direction of the Y axis in FIG. 9 to align the photomask PM2 to an exposure start position in the second exposure region. Then, stripe patterns are formed in the second exposure region by performing continuous exposure similar to that performed on the first exposure region.

Thus, the slit exposure method realizes large-area exposure as well as a size reduction of the photomask.

FIG. 13 is a partially enlarged view of a color filter manufactured by the slit exposure method.

In the color filter shown in FIG. 13, stripe colored patterns extending in the X direction are formed on a glass substrate on which a lattice-shaped black matrix 21 is formed, thereby forming red colored pixels 22R, green colored pixels 22G and blue colored pixels 22B. In the Y axis direction, a set of red, green, and blue colored pixel lines is repeatedly formed at a pitch Pi.

Also in the case of manufacturing color filters using the slit exposure method, it is general to form a plurality of color filters on a single substrate to realize mass production.

FIG. 14 is a plan view illustrating an example of manufacturing color filters by the slit exposure method. FIG. 15 is a cross-sectional view illustrating a method of forming an area of a substrate shown in FIG. 14, taken along a line X-X in FIG. 14. In FIG. 14, shaded portions at both sides of each display region represent regions where a front end and a rear end of a stripe-shaped colored pattern are located, respectively. A photomask shown in FIG. 15 is identical to that shown in FIG. 11, and has a slit including a plurality of openings and shielding parts.

Six (two rows×three columns) regions 54A and regions 54B surrounding the regions 54A are formed on the substrate 50. A stripe pattern of a colored layer is formed on each of the regions 54A. On the other hand, a stripe pattern of a colored layer is not formed on the regions 54B. The substrate 50 is placed on an exposure stage 60, and is freely transferred in the X and Y directions. A photomask PM2 is fixed in a position above the substrate 50, which position is irradiated with a light beam E from a light source. Further, a blind shutter BS is provided between the photomask and the light source (not shown) so as to be movable in the X-axis direction in FIG. 15.

The blind shutter BS blocks the light beam from the light source. The blind shutter BS includes an upper shielding plate and a lower shielding plate. The upper shielding plate and the lower shielding plate are individually and freely movable in the X-axis direction by means of a movement mechanism (not shown).

When performing exposure on the region 54A, the slit (not shown) of the photomask PM2 is irradiated with the light beam E from the light source, with the upper shielding plate and the lower shielding plate of the blind shutter BS being opened in the horizontal direction of FIG. 15, while continuously transferring the substrate 50 in the direction indicated by an outlined arrow. Thereby, a stripe pattern is formed on the region 54A.

After the exposure of the region 54A is completed, the upper shielding plate and the lower shielding plate of the blind shutter BS are closed to shield the photomask PM2 from the light beam. Thereby, a region 54B having no stripe pattern is formed.

Thereafter, exposure and shielding according to open and close of the blind shutter BS are repeated while transferring the substrate 50 in the outlined arrow direction to form stripe patterns on the three regions 54A arrayed in the X axis direction shown in FIG. 14.

When performing shielding by means of the blind shutter BS, the light beam E is diffracted at edges c and d of the blind shutter BS. Thereby, the amount of light irradiation on the resist becomes insufficient in regions G shown in FIG. 15.

FIG. 16 is a cross-sectional view of an end portion of a stripe pattern. The stripe pattern shown in FIG. 16 is obtained by developing a substrate exposed by the slit exposure method described with reference to FIGS. 14 and 15.

The stripe pattern 22 shown in FIG. 16 is formed so as to have a thickness (H1). However, due to the above-described insufficient irradiation, the thickness of the stripe pattern 22' in the region G (corresponding to the left-side region G in FIG. 15) is relatively thin.

The thickness of the stripe pattern 22' is gradually reduced toward an end g. Specifically, the thickness of the stripe pattern 22' is gradually reduced in order of (H1), (H1-ΔH3), (H1-ΔH2) from the left to the right of FIG. 16 (ΔH2>ΔH3).

The length of the region G (in the horizontal direction of FIG. 16) is 500 μm at maximum, and varies within a range of 300 μm to 500 μm. Such a reduction in thickness is caused by the type of the photoresist, the interval (gap) between the photomask and the substrate during proximity exposure, or the moving speed of the substrate. If such a thickness-reduced portion is positioned in the display region, a reduction in display quality may occur.

In the color filters, columnar spacers are formed in addition to the above-described colored layers. Hereinafter, the columnar spacers will be described with reference to FIGS. 17 to 19.

FIG. 17 shows an example of a color filter having columnar spacers. FIG. 18 is a cross-sectional view of the color filter shown in FIG. 17, taken along a line X-X in FIG. 17.

In the color filter shown in FIGS. 17 and 18, columnar spacers Cs are formed on a transparent electrode 23 above a black matrix 21 disposed on the substrate 50. Generally, the columnar spacers Cs are also formed in regions other than display sections. Hereinafter, the columnar spacers formed in regions other than the display sections are referred to as "dummy columnar spacers". The dummy columnar spacers maintain a uniform interval between the substrate other than the display sections and a counter substrate, and thus the interval between the substrate and the counter substrate can be kept uniform in the display regions.

FIG. 19 is a diagram illustrating an example in which a plurality of color filters are formed.

As described above, in the case where six (two lows×three columns) color filters are formed on a single substrate 50, the substrate 50 is divided into: display sections A in which colored pixels of the color filters are formed; frame sections B surrounding the display sections A; interplanar regions F between the respective display sections A; and a peripheral section D of the substrate 50. A region enclosed in a broken line C (a boundary between the frame section B and the peripheral section D) corresponds to the finished size of a color filter. The columnar spacers are formed in the display sections A, and the dummy columnar spacers are formed in the frame sections B, the interplanar regions F, and the peripheral section D.

FIG. 20 is a partial sectional view of a color filter manufactured by the step exposure method.

In a display section A, a black matrix 21, a colored pixel 22, and an ITO film 23 are disposed. A plurality of columnar spacers Cs are formed on the ITO film 23. On the other hand, a plurality of dummy columnar spacers D-Cs are formed at a pitch (Pi-2) in the frame section B, the interplanar region F, and the peripheral section D.

The colored pixel 22 is formed with a uniform thickness throughout, including a right end portion f. As shown by a broken line H, the columnar spacers Cs and the dummy columnar spacers D-Cs are formed so as to have uniform height.

FIG. 21 is a partial sectional view of the color filter formed by the slit exposure method.

In the color filter shown in FIG. 21, the stripe pattern 22' (a portion of the stripe pattern 22 in the region G), whose thickness is relatively thin due to the influence of the above-described diffraction, is formed in the display section A. If this color filter is incorporated in a display device, a reduction in display quality may occur. In order to avoid this problem, there is proposed a technique of adjusting the position of the end portion of the stripe pattern, as shown in FIG. 22.

FIG. 22 is a cross-sectional view illustrating another example of a color filter formed by the slit exposure method.

In the color filter shown in FIG. 22, the stripe pattern 22' (a portion of the stripe pattern 22 in the region G), whose thickness is relatively thin, is formed in the frame section B. In this structure, the thickness (H1) of the stripe pattern 22 in the display section A is made uniform to avoid a reduction in display quality.

CITATION LIST

Patent Literature

[Patent Literature 1] Japanese Laid-Open Patent Publication No. 2006-292955
[Patent Literature 2] Japanese Laid-Open Patent Publication No. 2006-17895
[Patent Literature 3] Japanese Laid-Open Patent Publication No. 2002-333628

SUMMARY OF THE INVENTION

Problems to be Solved by the Invention

In the color filter shown in FIG. 22, the stripe pattern 22' is formed in the frame section B. As described above, a plurality of dummy columnar spacers (not shown) are provided in the frame section B. If some of the dummy columnar spacers are placed on the stripe pattern 22', variations in height of the dummy columnar spacers increase. Such increase in variations in height of the dummy columnar spacers causes a new problem that the interval between the substrate and the counter substrate cannot be made uniform.

Therefore, an object of the present invention is to provide a method of manufacturing color filters having excellent display quality by a continuous exposure method using a compact photomask, and color filters manufactured by the method.

Solution to the Problems

A color filter of the present invention has a plurality of pixels arrayed in a first direction and a second direction perpendicular to the first direction. The color filter includes: a substrate; a light-shielding layer formed on the substrate, for dividing the substrate into rectangular display regions in which the plurality of pixels are arrayed, and non-display regions surrounding the display region; a stripe pattern comprising a plurality of colored layers extending in the first direction, each of the colored layers linearly extending in the first direction and intersecting with a pair of sides of the display region in the second direction, and the thicknesses of both end portions of each colored layer disposed on the non-display region are not uniform; a plurality of columnar spacers disposed in the display regions; and a plurality of dummy columnar spacers disposed in portions of the non-display regions, where the colored layers are absent.

A liquid crystal display device of the present invention has a plurality of pixels arrayed in a first direction and a second direction perpendicular to the first direction, and includes a color filter; a counter substrate facing the color filter; and a liquid crystal sealed between the color filter and the counter substrate. The color filter includes: a substrate; a light-shielding layer formed on the substrate, for dividing the substrate into rectangular display regions in which the plurality of pixels are arrayed, and non-display regions surrounding the display region; a stripe pattern comprising a plurality of colored layers extending in the first direction, each of the colored layers linearly extending in the first direction and intersecting with a pair of sides of the display region in the second direction, and the thicknesses of both end portions of each colored layer disposed on the non-display region are not uniform; a plurality of columnar spacers disposed in the display regions; and a plurality of dummy columnar spacers disposed in portions of the non-display regions, where the colored layers are absent.

A color filter manufacturing method of the present invention is for manufacturing a plurality of color filters on a single substrate along a first direction, each color filter having a plurality of pixels arrayed in the first direction and a second direction perpendicular to the first direction. The color filter manufacturing method includes the steps of: forming, on the substrate, a light shielding layer for dividing the substrate into rectangular display regions in which the plurality of pixels are arrayed, and non-display regions surrounding the display region; forming a plurality of colored layers, each linearly extending in the first direction and intersecting with a pair of sides of the display region in the second direction, by repeating, several times, a process of continuously exposing the substrate on which a resist is applied while transferring the substrate in the first direction, and a process of shielding an area between adjacent display regions in the first direction by using a shutter having a width narrower than the interval between the adjacent display regions in the first direction; forming a stripe pattern comprising a plurality of colors of colored layers by repeating the formation of the plurality of colored layers by the number of the colors of the colored pixels constituting the color filters; and forming a plurality of columnar spacers in the display regions, and forming a plurality of dummy columnar spacers in portions of the non-display regions, where the colored layers are absent.

Effects of the Invention

According to the present invention, color filters having excellent display quality can be manufactured by a continuous exposure method using a compact photomask.

EMBODIMENTS FOR CARRYING OUT THE INVENTION

First Embodiment

Figure 1:
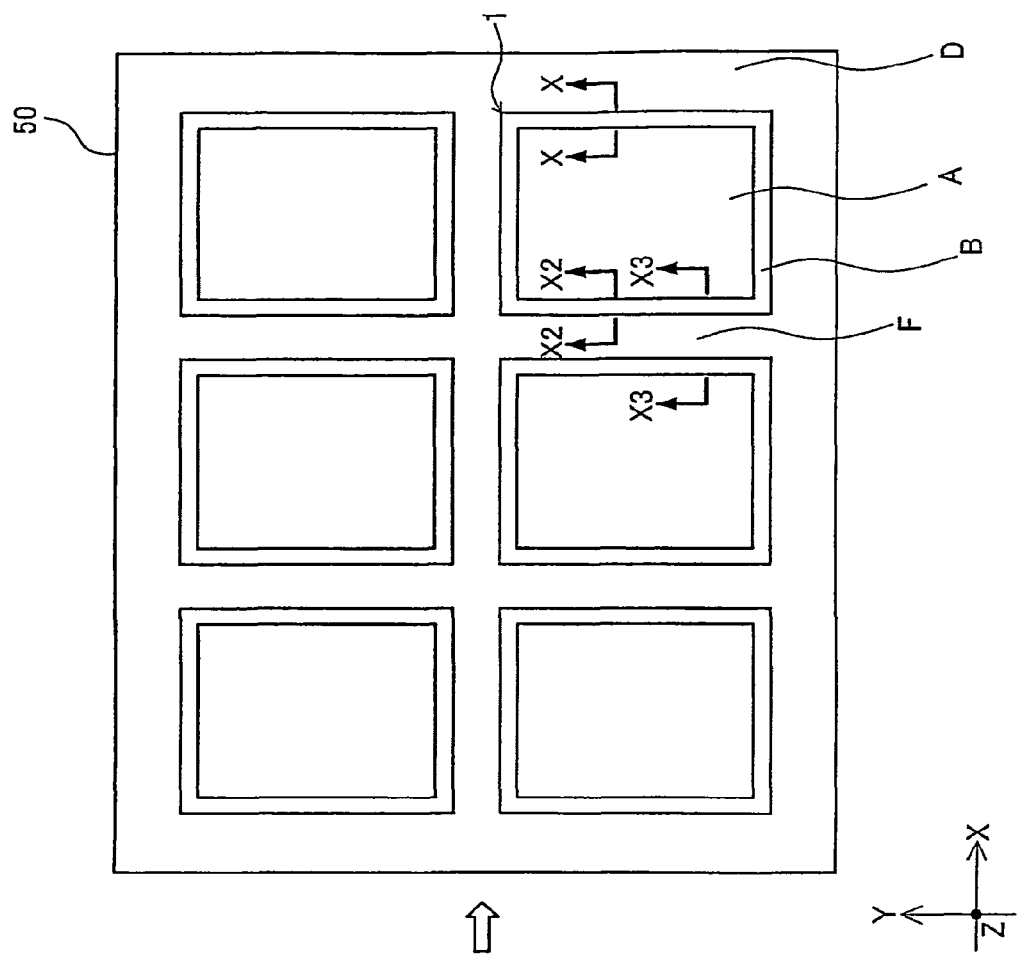
FIG. 1 is a plan view illustrating an example in which color filters according to a first embodiment are formed on a substrate.
Figure 2:
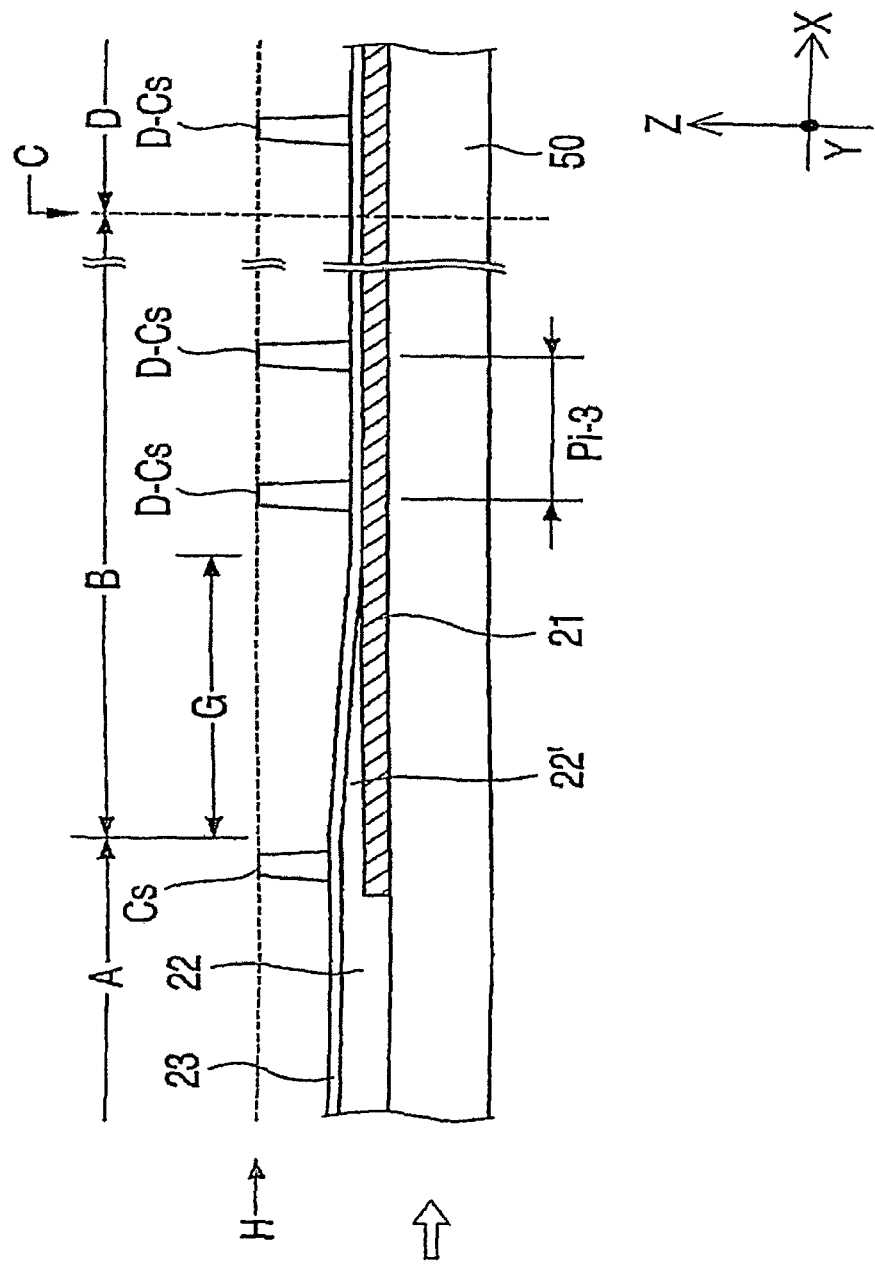
FIG. 2 is a cross-sectional view of the substrate, taken along a line X-X in FIG. 1.
Figure 3:
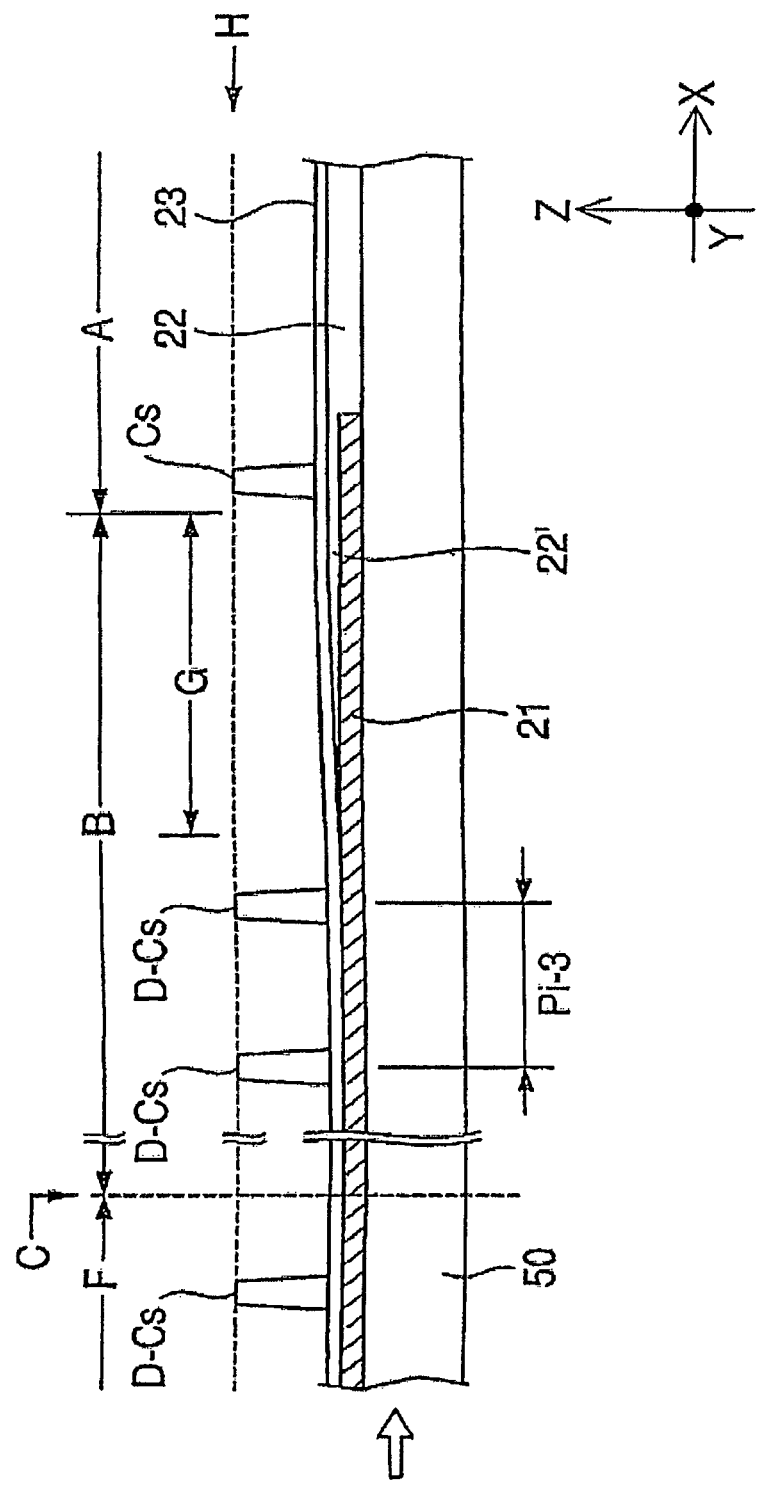
FIG. 3 is a cross-sectional view of the substrate, taken along a line X2-X2 in FIG. 1.

FIG. 1 is a plane view illustrating an example in which color filters according to a first embodiment of the present invention are formed on a substrate. FIG. 2 is a cross-sectional view of the substrate, taken along a line X-X in FIG. 1. FIG. 3 is a cross-sectional view of the substrate, taken along a line X2-X2 in FIG. 1. It should be noted that, in the following description, the substrate transferring direction during manufacturing is the X-axis direction.

On the substrate 50 shown in FIG. 1, six (two lows×three columns) color filters 1 are formed. In each of the color filters 1, a plurality of pixels are arrayed in the X-axis direction and the Y-axis direction. The color filter 1 includes a substrate 50, a black matrix 21, a stripe pattern 22, a plurality of columnar spacer Cs, and a plurality of dummy columnar spacers D-Cs.

The black matrix 21 is a light-shielding layer which divides the substrate into rectangular display sections A (corresponding to display regions), frame sections B, interplanar regions F, and a peripheral section D (B, F, and D correspond to non-display regions).

The stripe pattern 22 includes a plurality of linear colored layers having a plurality of colors. The plurality of colored layers constituting the stripe pattern 22 are repeatedly arranged in a predetermined order (e.g., in order of red, blue, and green). Each colored layer linearly extends in the X-axis direction, across the display section A and the non-display region surrounding the display section A. More specifically, each of the colored layers constituting the stripe pattern 22 intersects with each of a pair of sides of the display section A, which sides are parallel to the Y axis. Hereinafter, a part of the stripe pattern 22, which is formed in the frame section B, is referred to as a stripe pattern 22'. The thickness of the stripe pattern 22' shown in FIGS. 2 and 3 is gradually reduced toward an end thereof. On the other hand, the thickness of the stripe pattern 22 formed in the display section A is uniform.

A plurality of columnar spacers Cs are provided in the display section A. A plurality of dummy columnar spacers D-Cs are provided in the frame section B, the interplanar region F, and the peripheral section D. The dummy columnar spacers D-Cs are for maintaining a uniform interval between the substrate and a counter substrate (not shown).

The dummy columnar spacers D-Cs are formed on a portion of the frame section B, where the colored layer (stripe pattern 22') is not formed. Accordingly, as shown by a broken line H in FIGS. 2 and 3, the columnar spacers Cs and the dummy columnar spacers D-Cs are of uniform height.

As described above, the thickness of the colored layer in the display section A is uniform, and the columnar spacers Cs and the dummy columnar spacers D-Cs are of uniform height. Therefore, when a liquid crystal display device is configured by bonding the color filters 1 to the counter substrate, high display quality is realized.

Figure 4:
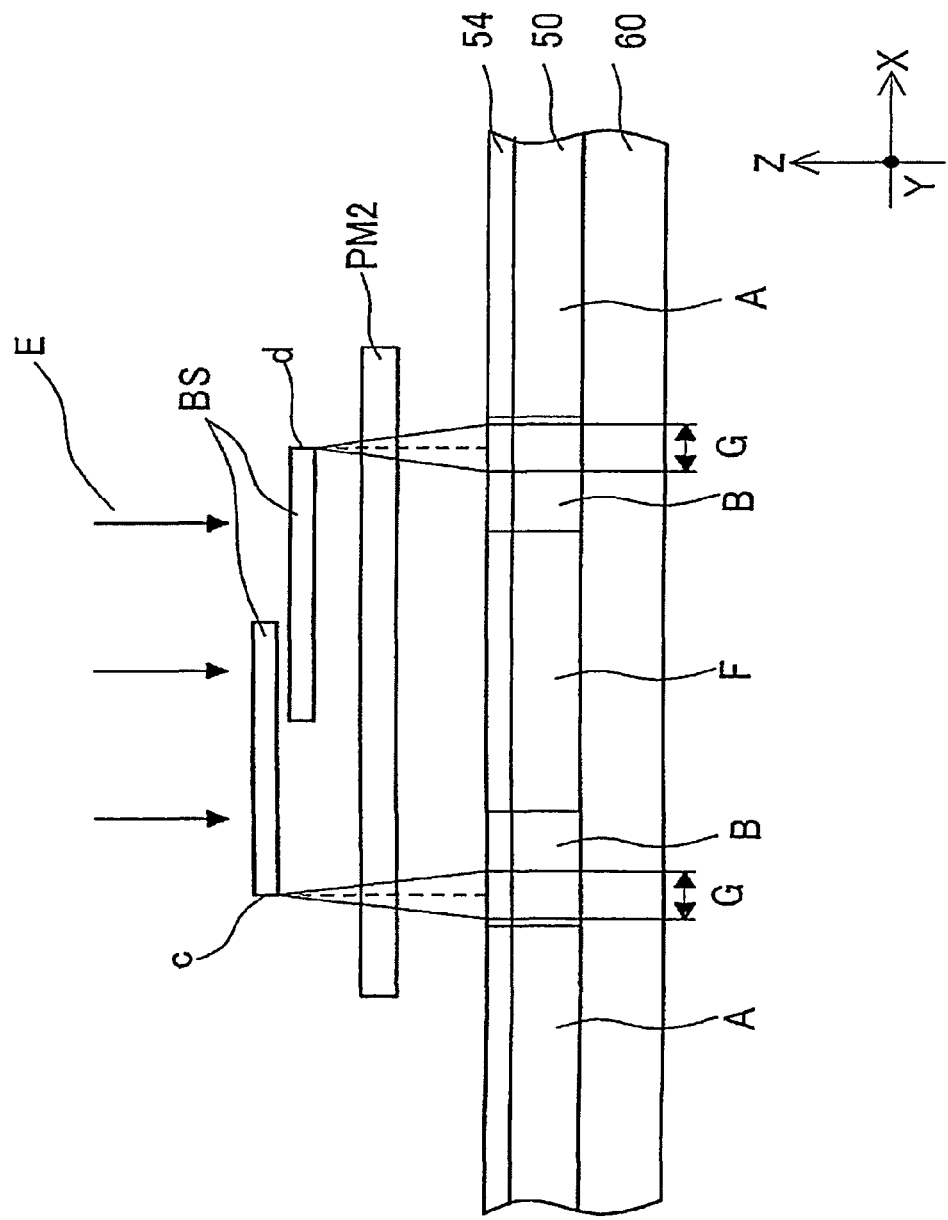
FIG. 4 is a diagram illustrating a method of forming a part along a line X3-X3 in FIG. 1.

The following will describe a method of manufacturing the color filters 1 with reference to FIGS. 1 and 4.

Figure 11:
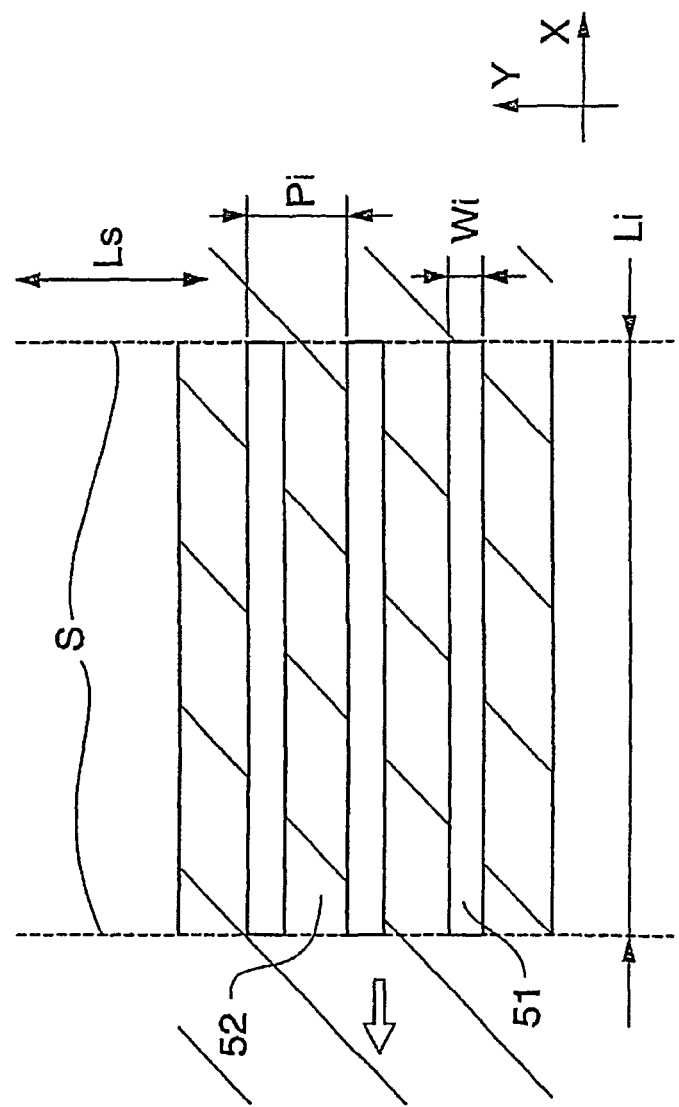
FIG. 11 is a partially enlarged view of a mask pattern of a photomask shown in FIG. 9.
Figure 12:
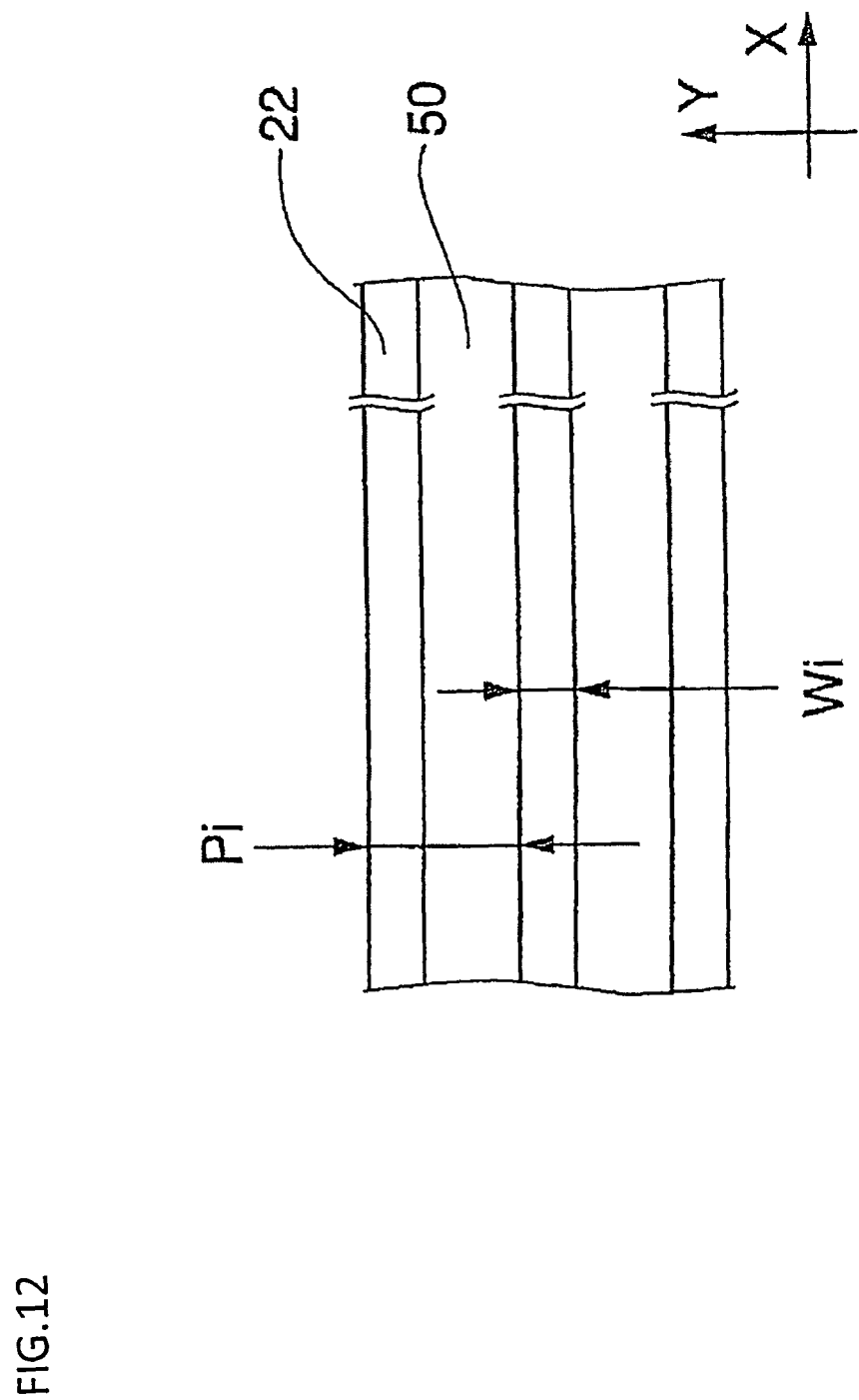
FIG. 12 is a partially enlarged view of stripe patterns exposed by the slit exposure method.
Figure 13:
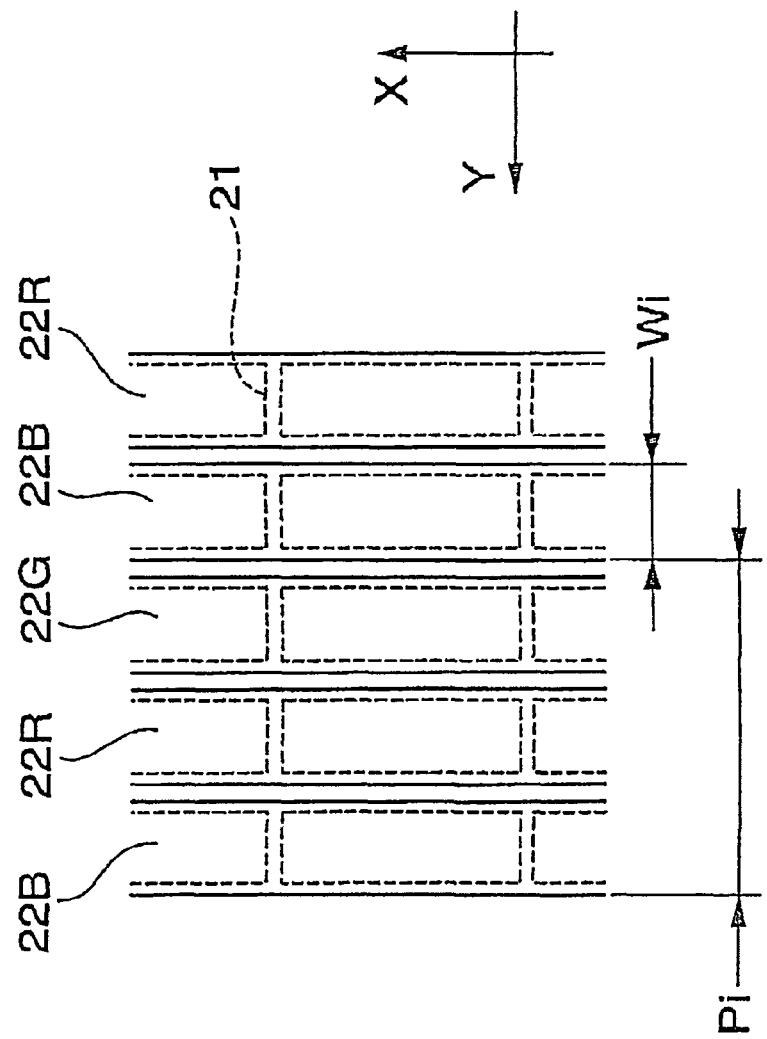
FIG. 13 is a partially enlarged view of a color filter manufactured by the slit exposure method.
Figure 14:
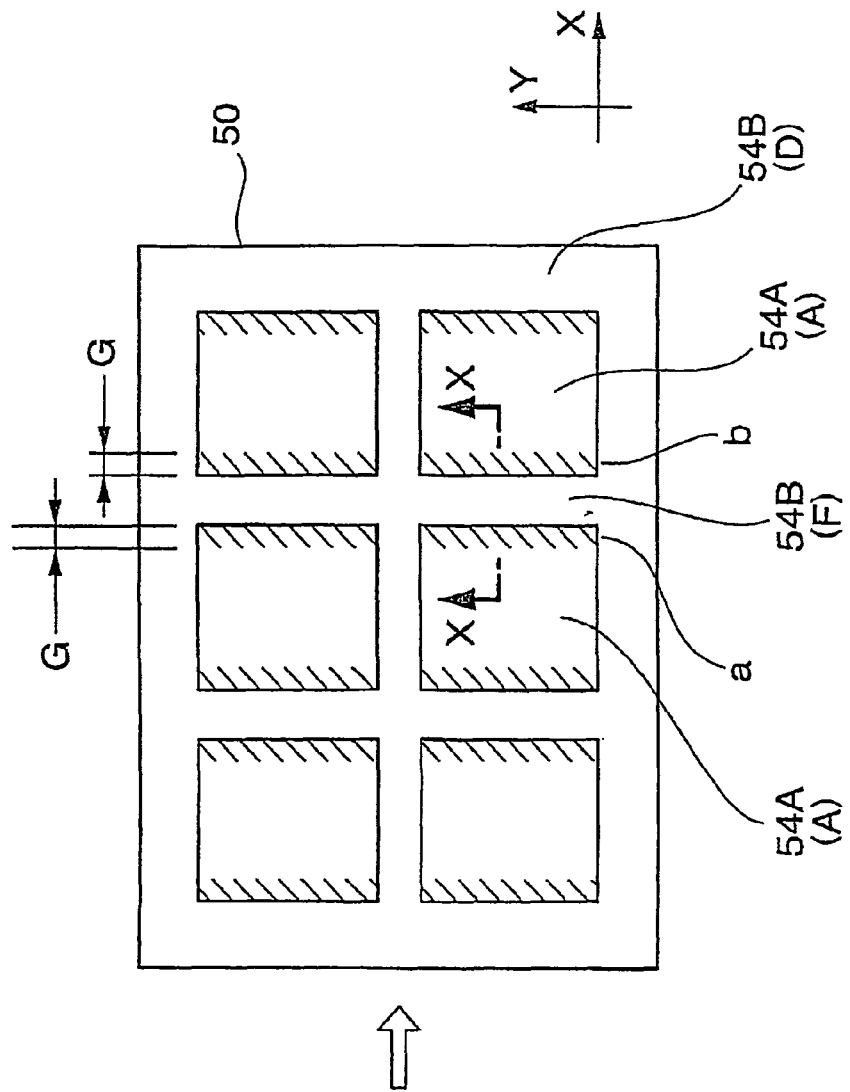
FIG. 14 is a plan view illustrating an example of manufacturing color filters by the slit exposure method.

FIG. 4 is a diagram illustrating a method of forming a part taken along a line X3-X3 in FIG. 1. A photomask PM2 shown in FIG. 4 is identical to that shown in FIG. 11, and has a slit S including a plurality of openings and shielding parts.

The substrate 50 is transferred in the X and Y directions by a transfer device 60. The photomask PM2 is fixed above the substrate 50 and within an irradiation range of a light beam E from a light source (not shown). A blind shutter BS is provided between the photomask PM2 and the light source so as to be freely movable in the horizontal direction of FIG. 4. The blind shutter BS includes an upper shielding plate and a lower shielding plate which are freely movable in the horizontal direction of FIG. 4 by a movement mechanism (not shown).

Firstly, on the substrate 50, a black matrix 21 is formed as a light-shielding layer for dividing the substrate 50 into the display regions and the non-display regions. In the display regions, the black matrix 21 is formed in a lattice shape, and defines the positions of the respective colored pixels. The light shielding layer is not limited to the black matrix, but may be a metal electrode. The method of forming the light shielding layer is not particularly limited, and various methods are applicable.

Next, open and close of the blind shutter BS are performed while transferring, in the X-axis direction, the substrate on which a color resist 54 of a first color is applied, thereby forming a stripe pattern 22 across the display section A and the non-display region surrounding the display section A. Specifically, with the upper shielding plate and the lower shielding plate of the blind shutter BS being opened, the color resist 54 on the display section A is irradiated with a light beam E from the light source while continuously transferring the substrate 50 in the X-axis direction. Thereby, a pattern of red colored layers is continuously exposed in the display section A. Further, as shown in FIG. 4, with the upper shielding plate and the lower shielding plate of the blind shutter BS being closed, an area between the display sections A which are adjacent to each other in the X-axis direction is shielded from the light beam E. During the light shielding, the amount of overlapping between the upper shielding plate and the lower shielding plate is adjusted so that the width of the blind shutter BS in the X-axis direction becomes narrower than the interval between the display sections A which are adjacent in the substrate transferring direction (the horizontal direction of the figure). By repeating, several times, the continuous exposure process and the light shielding process, the above-described colored layers are formed in each of the plurality of display sections A arrayed in the X-axis direction.

The exposure of the color resist is followed by predetermined steps such as development and washing.

After the formation of the colored layer of the first color, colored layers of second and subsequent colors are similarly formed. The above-described colored layer formation process is repeated as many times as the number of the colors of the colored pixels constituting the color filter, thereby forming a stripe pattern 22 including a plurality of colored layers of a plurality of colors.

Next, a resist for forming columnar spacers and dummy columnar spacers is applied to the substrate 50 on which the stripe pattern 22 is formed. One-shot exposure is performed over the entire surface of the substrate 50 by using a photomask having patterns corresponding to columnar spacers to be formed in the display regions and dummy columnar spacers to be formed in the non-display regions. At this time, the dummy columnar spacers are formed at positions outside the stripe pattern 22' whose thickness is not uniform. The positions where the dummy columnar spacers are formed can be controlled by the positions of the opening patterns on the photomask.

Figure 15:
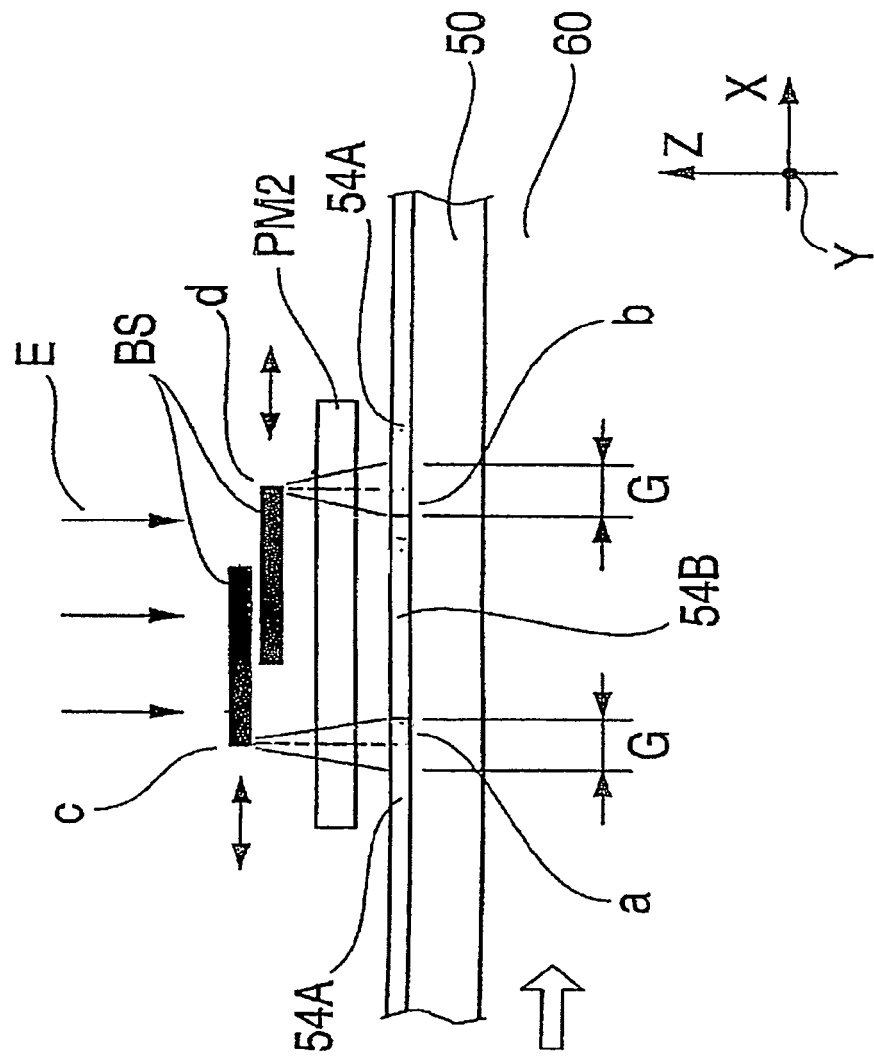
FIG. 15 is a cross-sectional view illustrating a method of forming a region of a substrate shown in FIG. 11, taken along a line X-X in FIG. 11.
Figure 16:
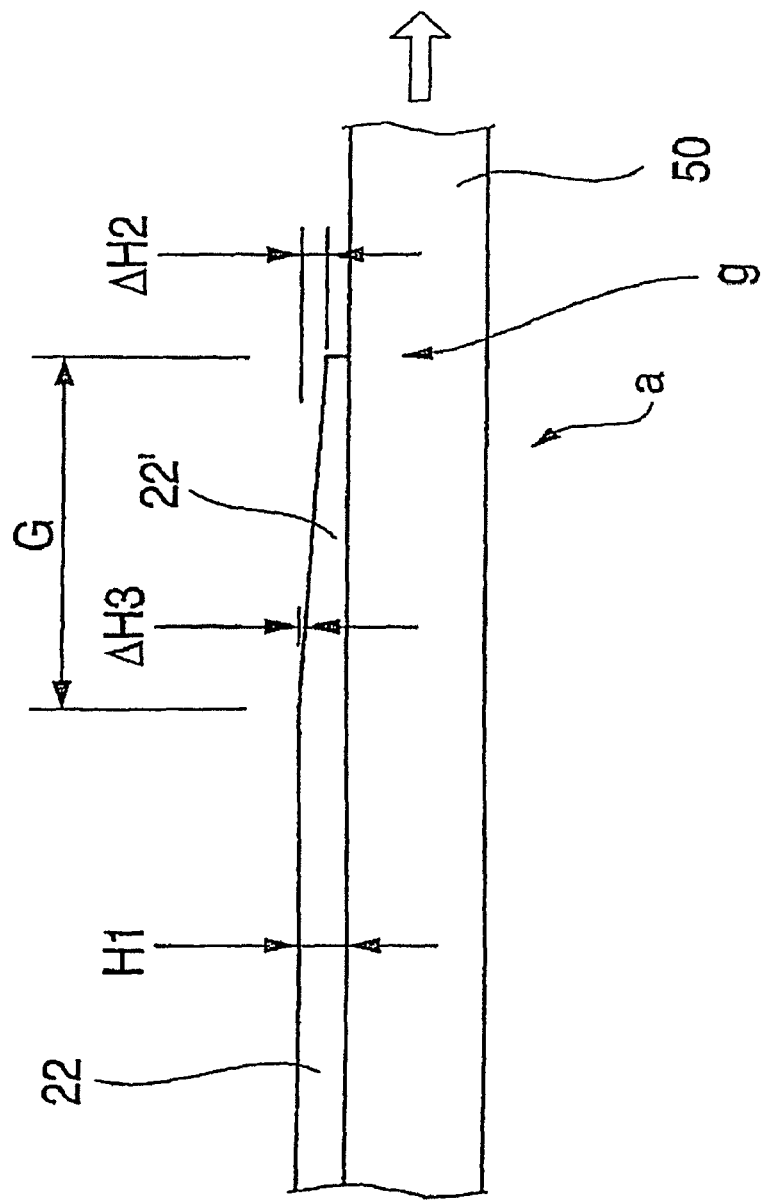
FIG. 16 is a cross-sectional view of an end portion of a stripe pattern.
Figure 17:
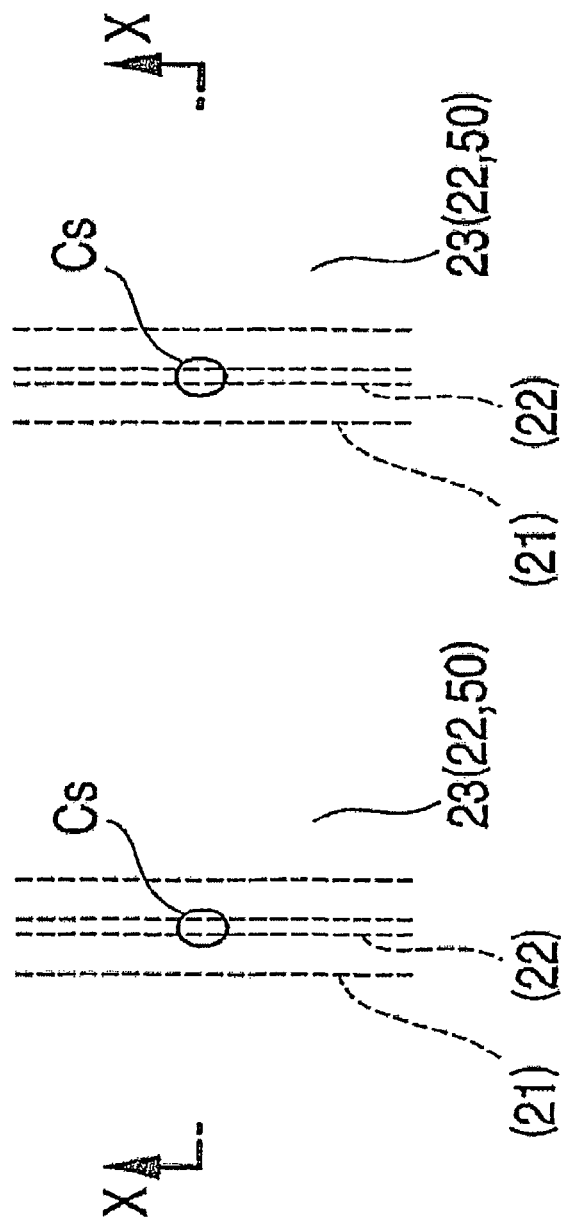
FIG. 17 is a diagram illustrating an example of a color filter on which columnar spaces are provided.
Figure 18:
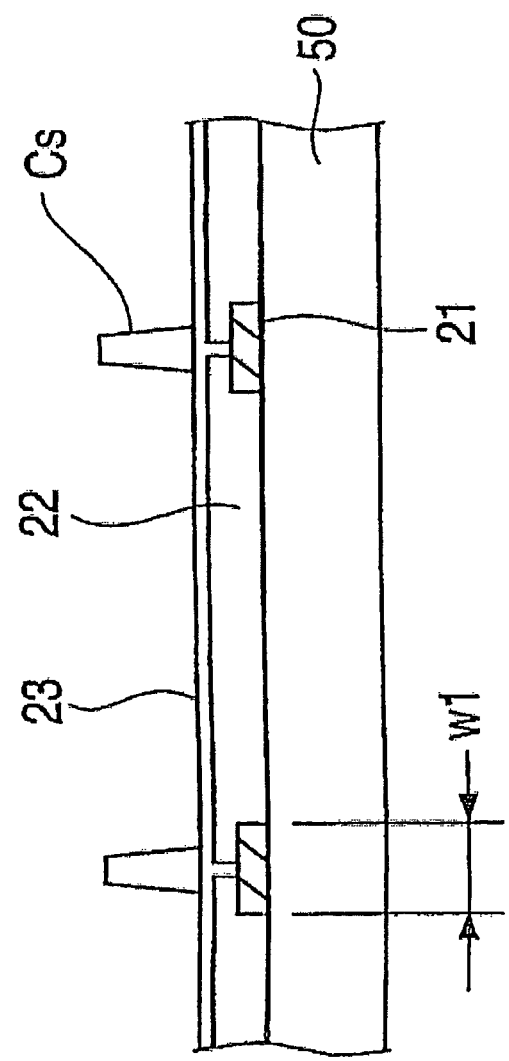
FIG. 18 is a cross-sectional view of the color filter shown in FIG. 17, taken along a line X-X in FIG. 17.
Figure 19:
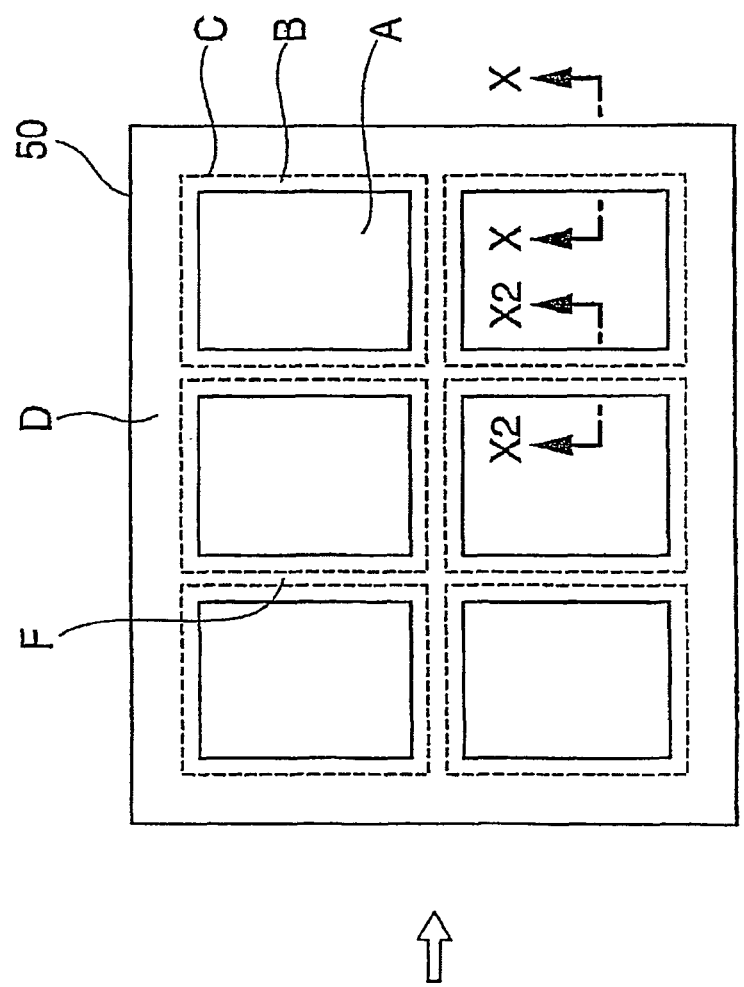
FIG. 19 is a diagram illustrating an example in which a plurality of color filters are formed on a substrate.
Figure 20:
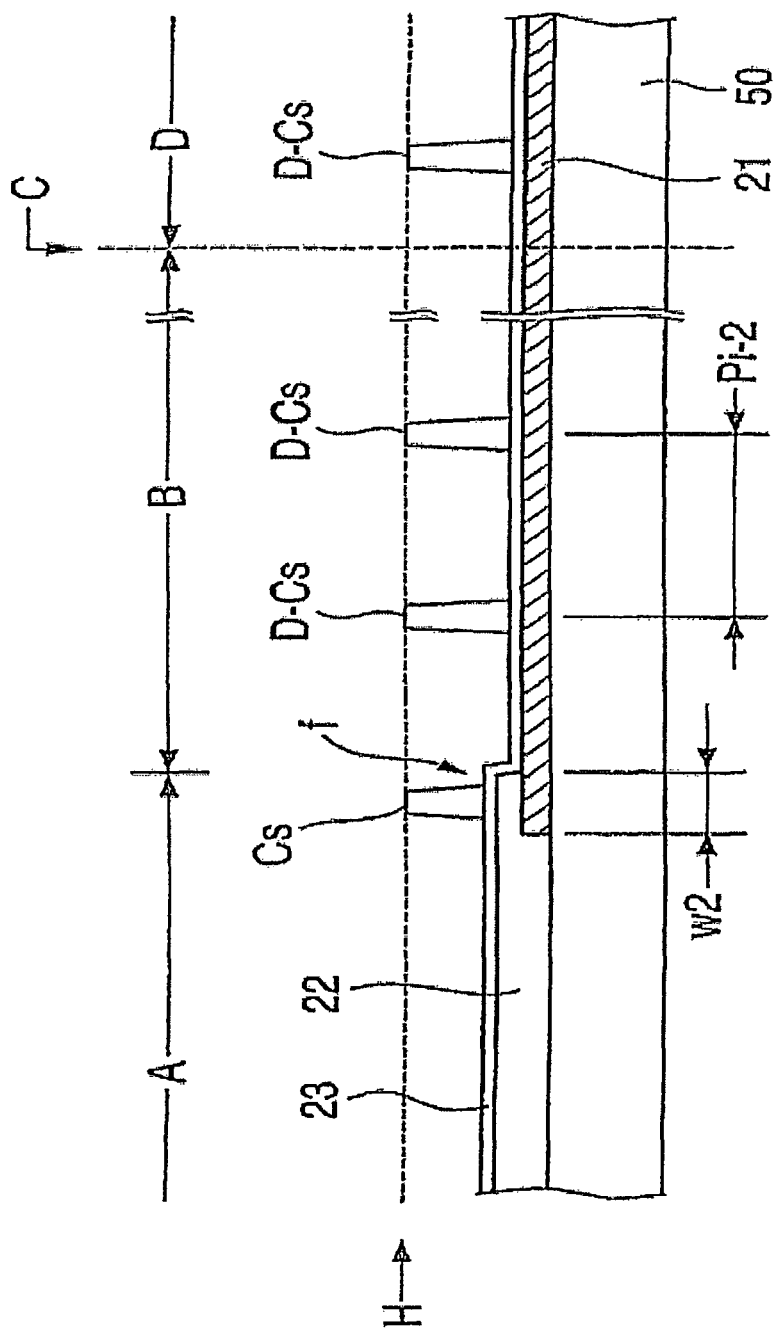
FIG. 20 is a partial sectional view of a color filter formed by the step exposure method.
Figure 21:
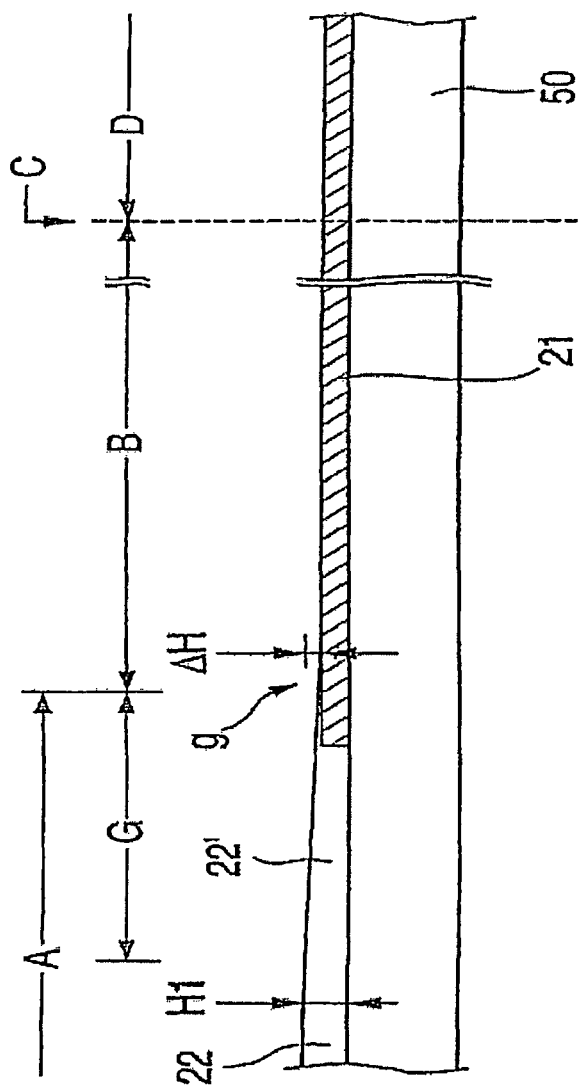
FIG. 21 is a partial sectional view of a color filter formed by the slit exposure method.
Figure 22:
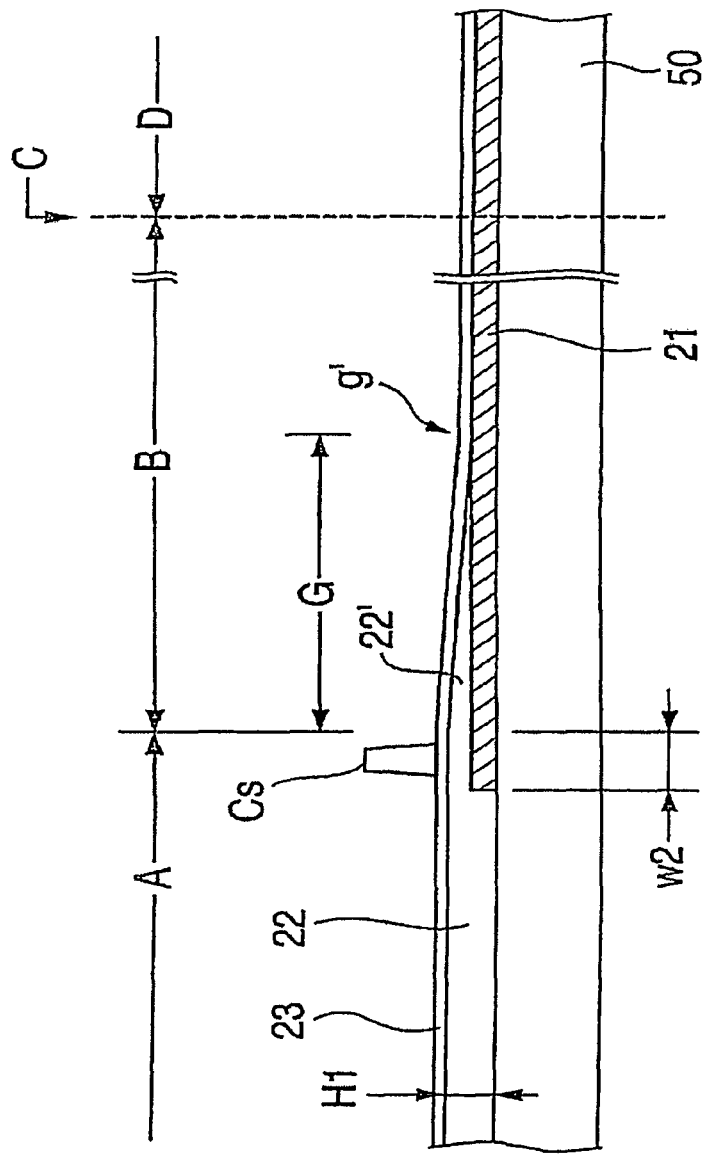
FIG. 22 is a cross-sectional view illustrating another example of a color filter formed by the slit exposure method.

As described with reference to FIGS. 15 and 16, during the light-shielding by the blind shutter BS, the light beam E is diffracted due to the edges c and d of the blind shutter BS. Thereby, the amount of irradiation of the light beam E to the regions G is insufficient. However, the width of the blind shutter BS is set narrower than the interval between the adjacent display sections A so that the regions G are positioned in the frame section B.

Specifically, the length of the regions G (in the X-axis direction in FIG. 4) is about 50 μm at maximum, and the actual length thereof varies within a range of 300 μm to 500 μm. Therefore, it is preferred that the width of the blind shutter BS be adjusted so that the distance from the boundary between the display section A and the frame section B to the end of the stripe pattern becomes 700 μm or more. Thus, the both ends (the portions having relatively thin thickness) can be reliably formed in the frame section.

As described above, in the manufacturing method according to the present embodiment, portions of the linear colored layers constituting the stripe pattern 22, whose thickness is not uniform, are formed on the non-display region, and the dummy columnar spacers D-Cs are formed only on portions of the non-display regions, where the colored layers are absent. Thereby, even when the slit exposure method is adopted, the dummy columnar spacers D-Cs can be formed on the uniform-thickness portions. Accordingly, the gap between the color filters and the counter substrate can be kept uniform by making the dummy columnar spacers D-Cs of uniform height.

Second Embodiment

Figure 5:
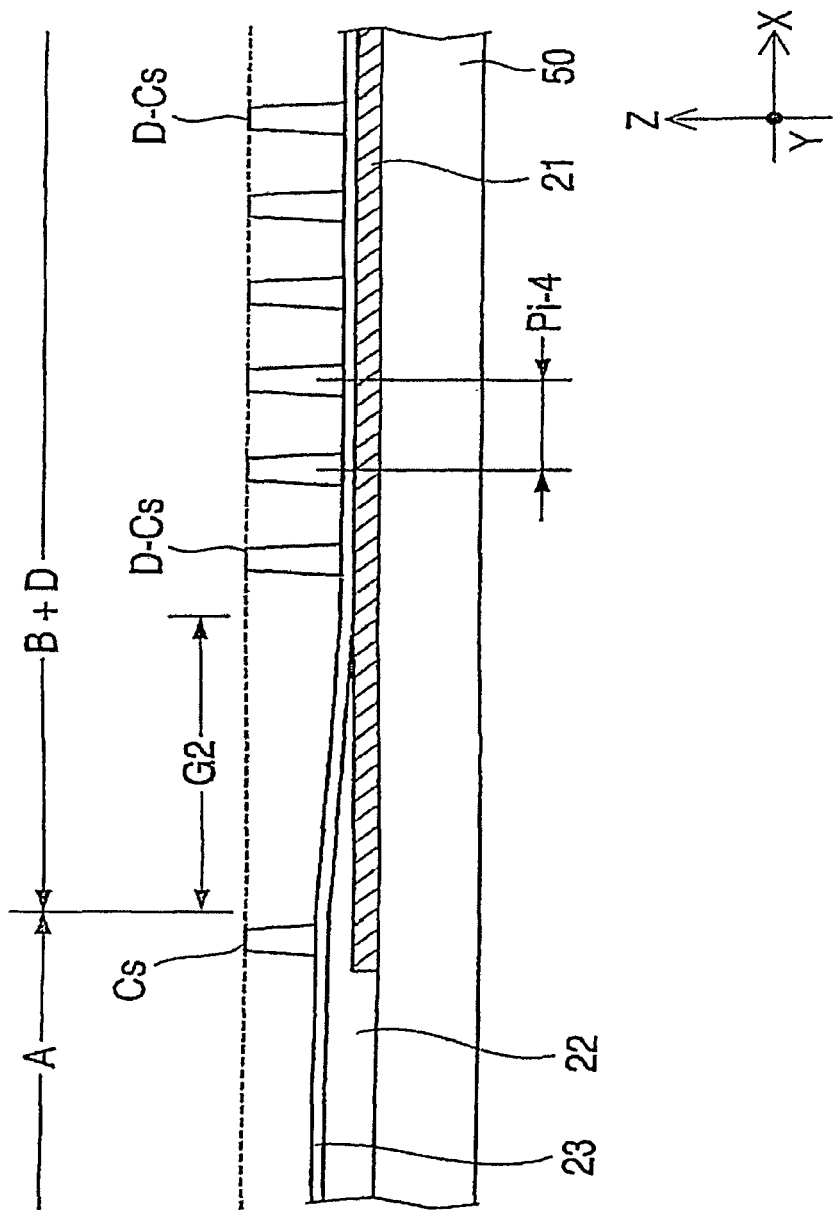
FIG. 5 is a partial sectional view of a color filter according to a second embodiment.
Figure 6:
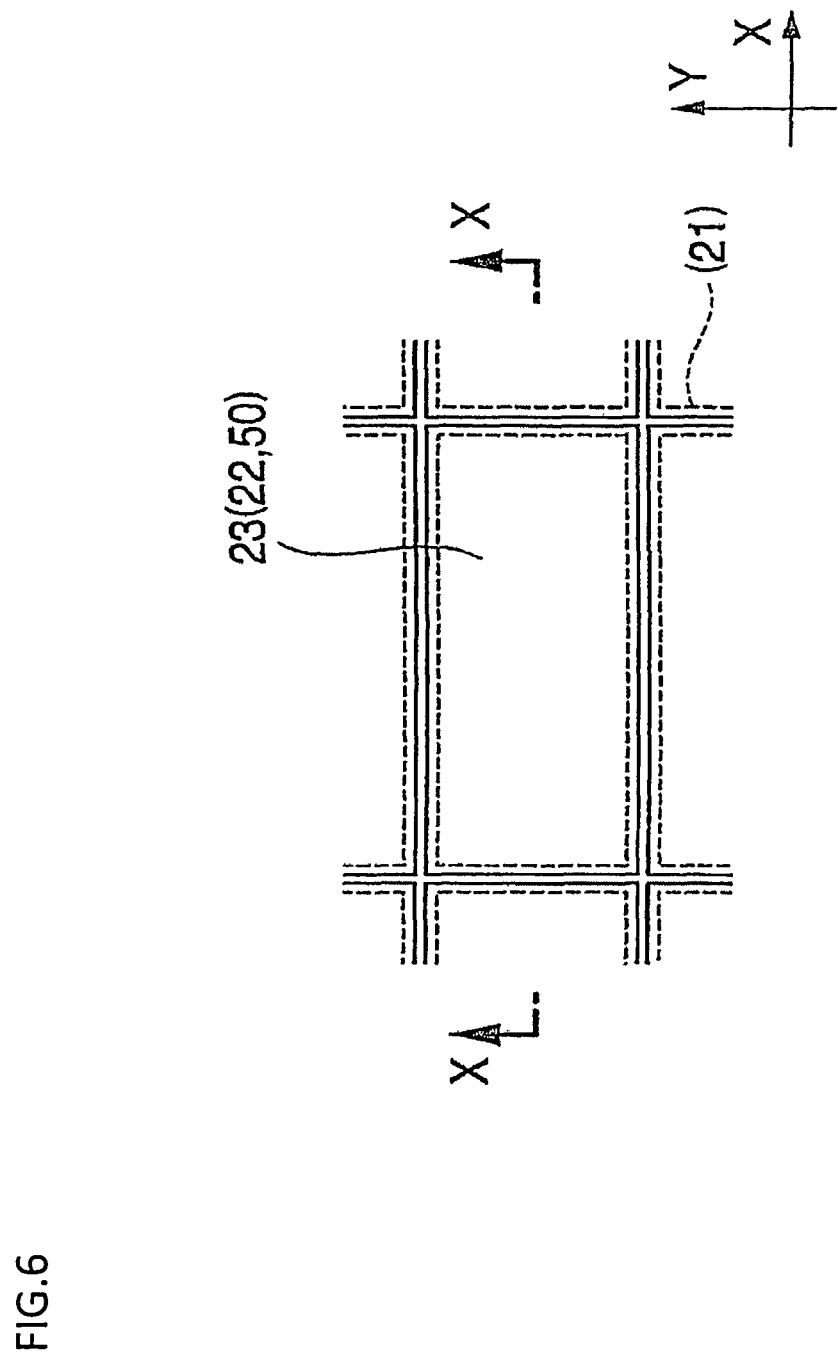
FIG. 6 is an enlarged view of pixels of a color filter.
Figure 7:
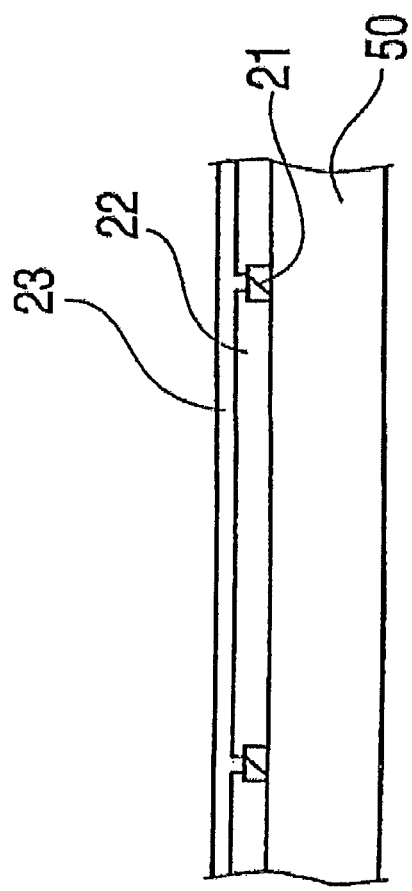
FIG. 7 is a cross-sectional view of a pixel of the color filter shown in FIG. 6, taken along a line X-X in FIG. 6.
Figure 8:
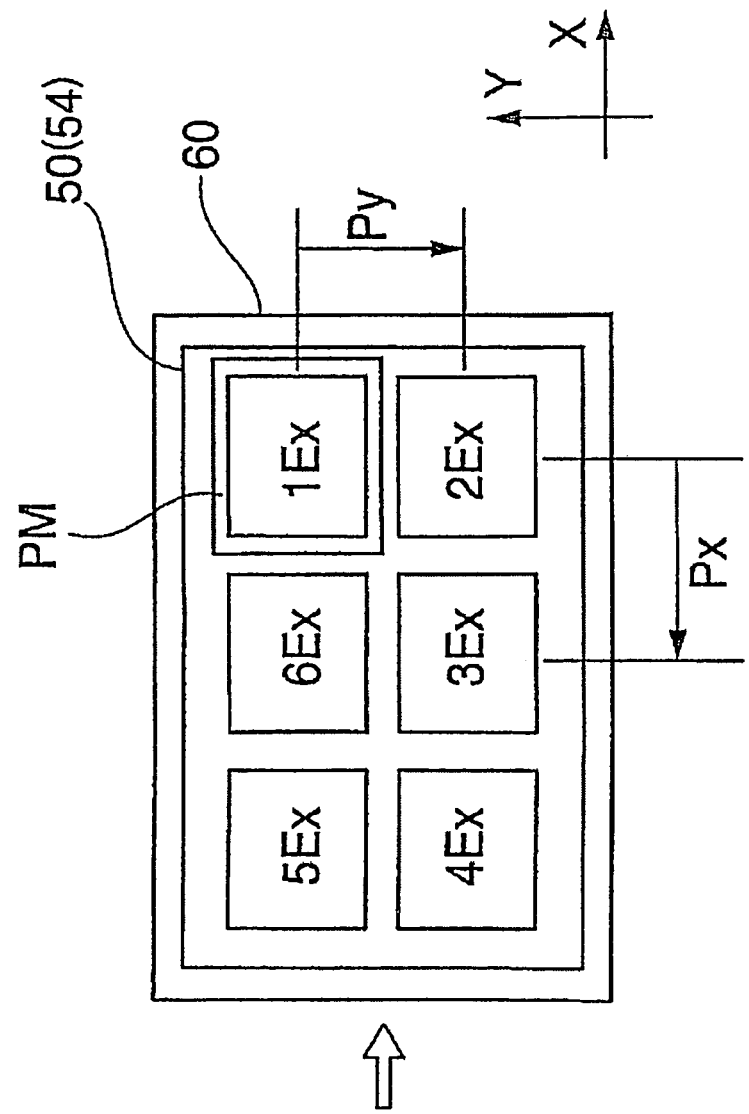
FIG. 8 is a plan view illustrating an example of manufacturing color filters by the XY step exposure method.
Figure 9:
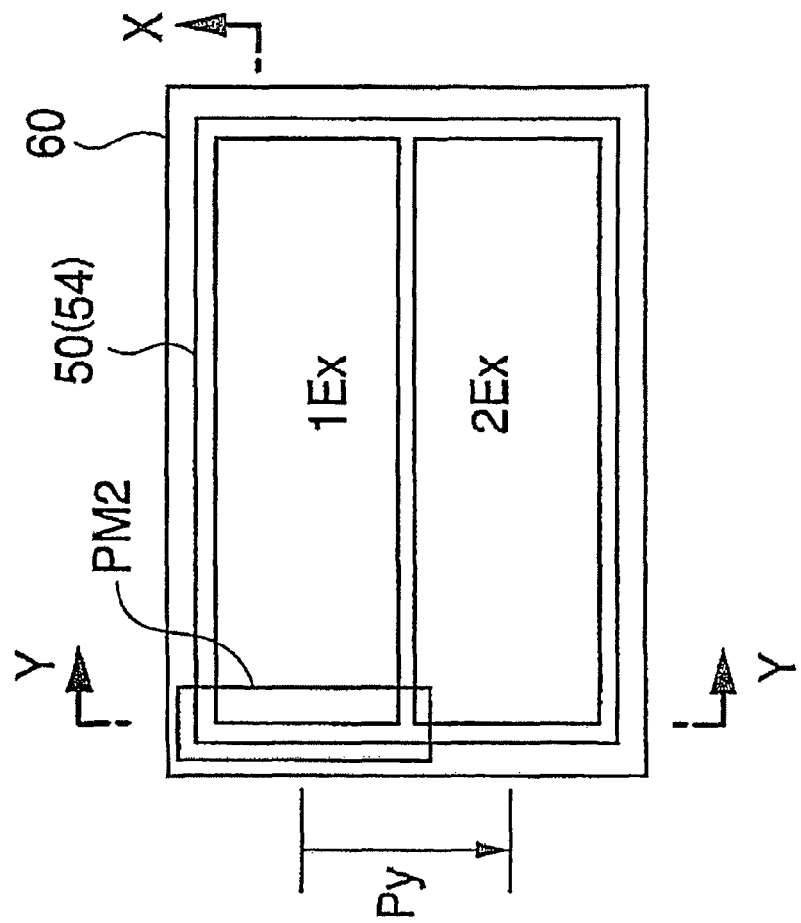
FIG. 9 is a plan view illustrating the slit exposure method.
Figure 10:
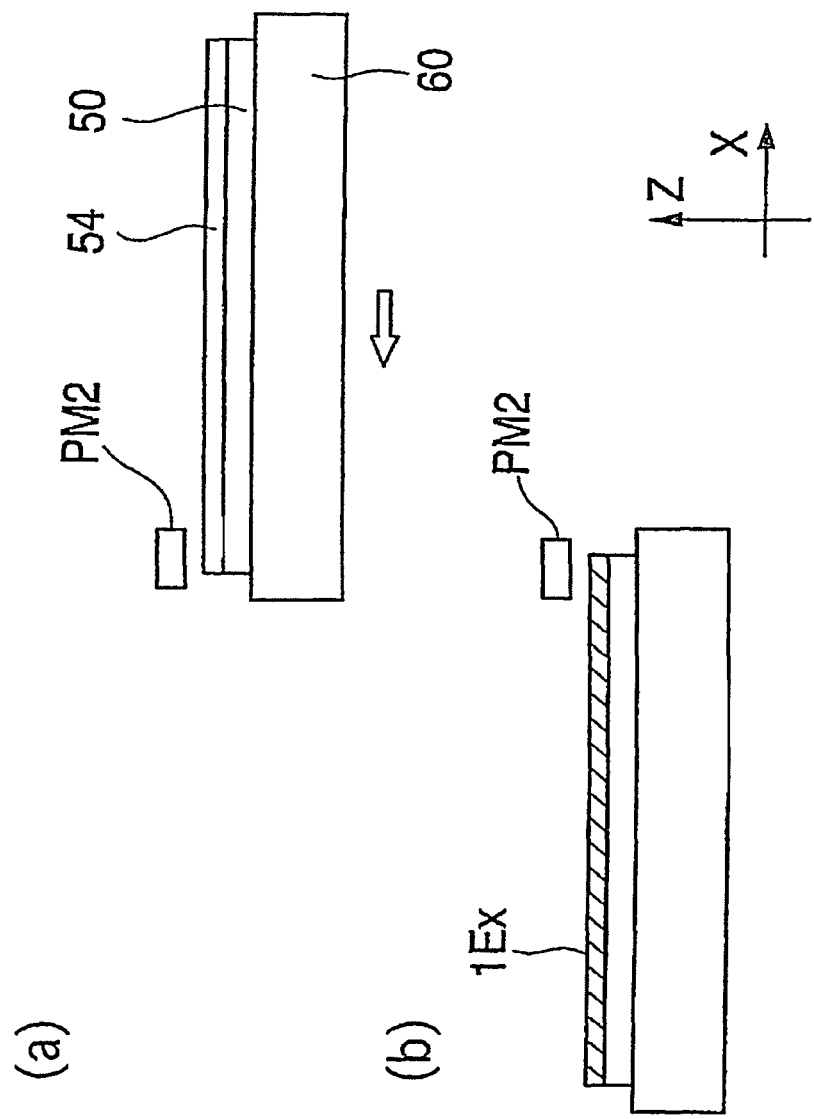
FIG. 10 is a cross-sectional view taken along a line X-X in FIG. 9.

FIG. 5 is a partial cross-sectional view of a color filter according to a second embodiment. FIG. 5 shows a part corresponding to a cross section of the substrate, taken along a line X-X in FIG. 1. Since a method of manufacturing color filters according to the second embodiment is identical to that of the first embodiment, repeated description is not necessary.

The length (in the X-axis direction) of the stripe pattern 22 formed in the frame section B varies as described above. The longer the stripe pattern 22 formed in the frame section B, the greater an external force applied to the dummy columnar spacers D-Cs when bonding the substrate 50 to a counter substrate. Accordingly, it is desirable that the density of dummy columnar spaces (number of dummy columnar spacers per unit area) should be changed according to the length of the stripe pattern 22 formed in the frame section B.

The length G2 of the stripe pattern 22 formed in the frame section B shown in FIG. 5 is longer than the length G of the stripe pattern 22' shown in FIGS. 2 and 3. In this case, the density of dummy columnar spacers D-Cs is set high. For example, the pitch Pi-4 of the dummy columnar spacers D-Cs shown in FIG. 5 is smaller than the pitch Pi-3 of the dummy columnar spacers D-Cs shown in FIGS. 2 and 3. Thereby, an external force applied to a single dummy columnar spacer D-Cs from the counter substrate can be reduced, resulting in successful bonding between the substrate 50 and the counter substrate.

In the first and second embodiments, the dummy columnar spacers are formed in all of the frame sections, the interplanar regions, and the peripheral section, the present invention is not limited thereto. The dummy columnar spacers may be formed on any positions so long as a plurality of dummy columnar spaces are located on the non-display region other than the colored layers formed in the frame sections.

While in the first and second embodiments a black matrix is used as a light-shielding layer, the present invention is not limited thereto. Any light-shielding layer may be used so long as it can divide the substrate into the display regions and the non-display regions. For example, an electrode layer made of a thin metal may be formed on the substrate as a light-shielding layer.

While in the first and second embodiments a blind shutter having a pair of shielding plates is used to shield the substrate from a light beam, the present invention is not limited thereto. For example, a single shielding plate having a width narrower than the interval between adjacent display regions may be used.

A liquid crystal display device using color filters according to the first or second embodiment can be manufactured by bonding the color filters to a counter substrate facing the color filters, and a liquid crystal is sealed between the both substrates. The color filters of the present invention are also applicable to display devices (an organic EL display and the like) other than the liquid crystal display device.

INDUSTRIAL APPLICABILITY

The present invention can be used for manufacturing color filters or the like to be used in liquid crystal display devices and organic EL displays.

DESCRIPTION OF THE REFERENCE CHARACTERS 1 color filter
21 black matrix
22, 22' stripe pattern
23 transparent electrode
50 substrate
51 openings of a slit
52 light-shielding parts of the slit
54 resist
54A, 54B region
60 exposure stage
A display section
B frame section
BS blind shutter
Cs columnar spacer
D-Cs dummy columnar spacer
F interplanar region
PM, PM2 photomask
S slit

The invention claimed is:

1. A color filter in which a plurality of pixels are arrayed in a first direction and a second direction perpendicular to the first direction, the color filter comprising:
   a substrate;
   a light-shielding layer formed on the substrate, for dividing the substrate into rectangular display regions in which the plurality of pixels are arrayed, and non-display regions surrounding the display region;
   a stripe pattern comprising a plurality of colored layers extending in the first direction, each of the colored layers linearly extending in the first direction and intersecting with a pair of sides of the display region in the second direction, in which the thicknesses of both end portions in the first direction of each colored layer disposed on the non-display region are not uniform, and a portion of the stripe pattern in which the thickness of one of the both end portions in the first direction is not uniform has a length along the first direction equal to or larger than 300 μm;
   a plurality of columnar spacers disposed in the display regions; and
   a plurality of dummy columnar spacers disposed in portions of the non-display regions, where the colored layers are absent,
   wherein end portions, of the plurality of columnar spacers and the plurality of dummy columnar spacers, that are farther away from the substrate are each coplanar with each other on a plane parallel to the substrate.

2. A liquid crystal display device in which a plurality of pixels are arrayed in a first direction and a second direction perpendicular to the first direction, the liquid crystal display device comprising:
   a color filter;
   a counter substrate facing the color filter; and
   a liquid crystal sealed between the color filter and the counter substrate, wherein
   the color filter comprises:
   a substrate;
   a light-shielding layer formed on the substrate, for dividing the substrate into rectangular display regions in which the plurality of pixels are arrayed, and non-display regions surrounding the display region;
   a stripe pattern comprising a plurality of colored layers extending in the first direction, each of the colored layers linearly extending in the first direction and intersecting with a pair of sides of the display region in the second direction, in which the thicknesses of both end portions in the first direction of each colored layer disposed on the non-display region are not uniform, and a portion of the stripe pattern in which the thickness of one of the both end portions in the first direction is not uniform has a length along the first direction equal to or larger than 300 μm;
   a plurality of columnar spacers disposed in the display regions; and
   a plurality of dummy columnar spacers disposed in portions of the non-display regions, where the colored layers are absent,
   wherein end portions, of the plurality of columnar spacers and the plurality of dummy columnar spacers, that are farther away from the substrate are each coplanar with each other on a plane parallel to the substrate.

* * * * *